(12) United States Patent
Henry et al.

(10) Patent No.: US 9,321,521 B2
(45) Date of Patent: Apr. 26, 2016

(54) THERMALLY ACTIVATED VARIABLE STIFFNESS COMPOSITES FOR AIRCRAFT SEALS

(71) Applicant: The Boeing Company, Chicago, IL (US)

(72) Inventors: Christopher P. Henry, Thousand Oaks, CA (US); Geoffrey P. McKnight, Los Angeles, CA (US); Guillermo A. Herrera, Winnetka, CA (US); Robert E. Doty, Los Angeles, CA (US); Richard Lee Clemons, Los Angeles, CA (US); Donald V. Drouin, Jr., O'Fallon, IL (US)

(73) Assignee: THE BOEING COMPANY, Chicago, IL (US)

( * ) Notice: Subject to any disclaimer, the term of this patent is extended or adjusted under 35 U.S.C. 154(b) by 301 days.

(21) Appl. No.: 13/913,556

(22) Filed: Jun. 10, 2013

(65) Prior Publication Data
US 2013/0292367 A1 Nov. 7, 2013

Related U.S. Application Data

(62) Division of application No. 12/166,770, filed on Jul. 2, 2008, now Pat. No. 8,476,564.

(51) Int. Cl.
*H05B 6/64* (2006.01)
*B64C 3/56* (2006.01)
*C21D 1/00* (2006.01)

(52) U.S. Cl.
CPC . *B64C 3/56* (2013.01); *Y02T 50/145* (2013.01)

(58) Field of Classification Search
CPC .................. B64C 3/56; Y02T 50/145
USPC .......... 219/679, 748, 202; 244/49, 46, 123.1, 244/124, 13, 3.27, 99.8, 99.2, 218, 3.2, 37, 244/131
See application file for complete search history.

(56) References Cited

U.S. PATENT DOCUMENTS

| | | | |
|---|---|---|---|
| 7,066,428 B1 | 6/2006 | Haggard et al. | |
| 7,777,165 B2 | 8/2010 | Sanderson et al. | |
| 8,056,853 B2 * | 11/2011 | Eisentraut et al. | 244/46 |
| 2002/0066825 A1 | 6/2002 | Miralles et al. | |
| 2002/0195177 A1 | 12/2002 | Hinkley et al. | |
| 2010/0000991 A1 | 1/2010 | Henry et al. | |

OTHER PUBLICATIONS

Office Action, dated Aug. 30, 2012, regarding U.S. Appl. No. 12/166,770, 9 pages.
Final Office Action, dated Jan. 2, 2013, regarding U.S. Appl. No. 12/166,770, 8 pages.
Notice of Allowance, dated Mar. 5, 2013, regarding U.S. Appl. No. 12/166,770, 7 pages.

* cited by examiner

*Primary Examiner* — Quang Van
(74) *Attorney, Agent, or Firm* — Yee & Associates, P.C.

(57) ABSTRACT

An apparatus has a first structure, a second structure, and an activated seal. The second structure has a first position adjacent to the first structure such that the first structure is not in contact with the second structure. The activated seal is attached to at least one of the first structure and the second structure. The activated seal has a variable stiffness that may be changed in response to a stimuli such that the activated seal is capable of being deformed when at least one of the first structure and the second structure are moved relative to each other.

6 Claims, 16 Drawing Sheets

THERMALLY ACTIVATED VARIABLE STIFFNESS COMPOSITES FOR AIRCRAFT SEALS

This application is a divisional of application Ser. No. 12/166,770, filed Jul. 2, 2008; status, issued as U.S. Pat. No 8,476,564 on Jul. 2, 2013.

BACKGROUND INFORMATION

1. Field

The present disclosure relates generally to aircraft components and in particular to thermally activated variable stiffness composite materials used in aircraft components. Still more particularly, the present disclosure relates to a method and apparatus for using thermally activated variable stiffness composite materials in seals for aircraft.

2. Background

In aircraft, a folding wing is a design feature that may be used to save space. For example, naval based aircraft that operate from limited deck space on an aircraft carrier may have folding wings to reduce the amount of space occupied by the aircraft. A folding wing allows an aircraft to occupy less space in a confined hangar because the folded wing normally rises over the fuselage.

This folded configuration decreases the floor area occupied by the aircraft. In some cases, vertical clearance may be limited on hangar decks in an aircraft carrier. With this type of limit, some aircraft may have additional hinges to fold the wing tips downwards.

With folding wings, seals may be present at any movable joint with a gap. A seal may provide a capability to cover the chord-wise seam between inboard and outboard wing sections and prevent gap formation between the seal and outboard wing section when the wings are in an unfolded condition. Further, the seals may allow for maintaining a continuous surface when the wing is in an unfolded condition to provide better aerodynamic performance.

Currently available seals used in aircraft may use a graded thickness graphite reinforced fiber polymer composite flap that overlaps a seam between the inboard and outboard wing structures. Preloading this "knife" seal against the opposing wing surface helps prevent gap formation during in-flight air aero loads and wing deflections during maneuvers. The thinner flexible portion of the knife-edge of the seal may accommodate wing deflections during maneuvers.

Additionally, this type of seal also may permit electrical conductivity and impedance continuity across the gap for low observable properties. Further, with this type of seal, the thin knife-edge of the flap is compliant to permit sufficient deflection needed for wing folding.

These requirements may change along the chord length of the wing as a result of factors such as, for example, wing curvature, hinge mechanism, design aerodynamic continuity, and electrical continuity. The contradictory stiffness and deformation requirements may be difficult to balance in a manner that prevents physical gap formation and allows for electrical continuity in the seal.

Therefore, it would be desirable to have a method and apparatus that overcomes the problems described above.

SUMMARY

In one advantageous embodiment, an apparatus has a first structure, a second structure, and an activated seal. The second structure has a first position adjacent to the first structure such that the first structure is not in contact with the second structure. The activated seal is attached to at least one of the first structure and the second structure. The activated seal has a variable stiffness that may be changed in response to a stimuli such that the activated seal is capable of being deformed when at least one of the first structure and the second structure are moved relative to each other.

In another advantageous embodiment, an aircraft comprises a fuselage, an outboard wing structure, an inboard wing structure, a hinge unit, a thermally activated seal, and an activation unit. The hinge unit is capable of allowing the outboard wing structure to move relative to the inboard wing structure between a deployed position and a stowed position. The thermally activated seal is attached to at least one of the outboard wing structure and the inboard wing structure. The thermally activated seal has a variable stiffness that may be changed in response to a change in a temperature in the thermally activated seal such that the thermally activated seal is capable of changing stiffness and being deformed when the outboard wing structure is moved between the deployed position and the stowed position. The activation unit is capable of applying heat to the thermally activated seal to change the temperature of the thermally activated seal to a selected temperature at which the thermally activated seal is substantially compliant.

In yet another advantageous embodiment, a method is present for reducing gaps in an apparatus. A temperature of a thermally activated seal is changed to change a stiffness of the thermally activated seal from a substantially stiff state to a substantially compliant state, wherein the thermally activated seal is attached to at least one of a first structure and a second structure in the apparatus. At least one of the first structure and the second structure is moved while the thermally activated seal is in the substantially compliant state such that a gap between the first structure and the second structure in the apparatus is reduced.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
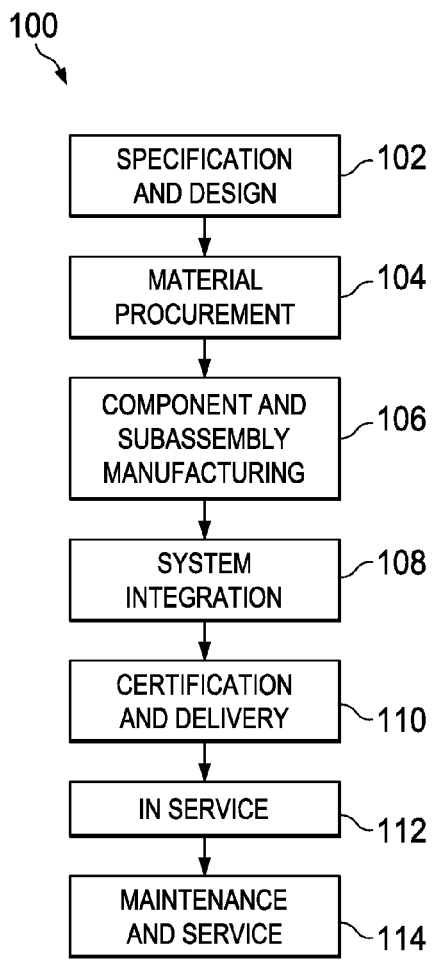
FIG. 1 is a diagram illustrating an aircraft manufacturing and service method in which an advantageous embodiment may be implemented.
Figure 2:
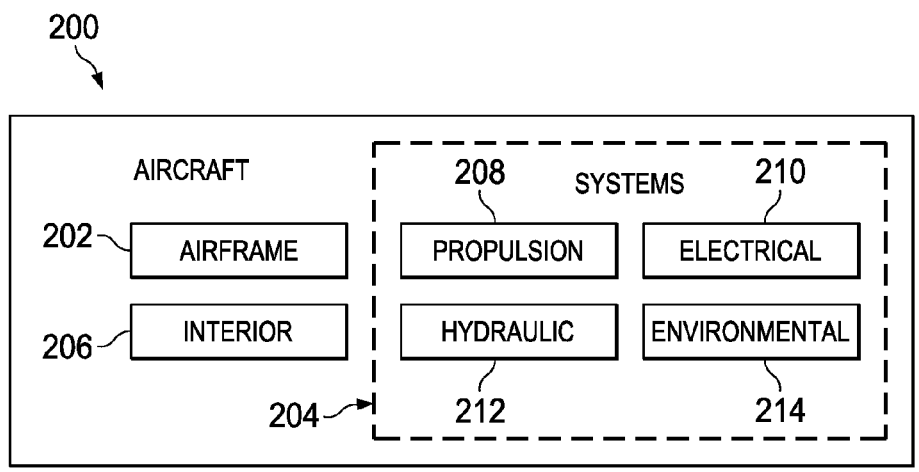
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment.

During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize that vehicles, such as, for example, aircraft, may have mechanisms that interact with low observable sensitive and/or aero-sensitive external surfaces. These types of mechanisms may have important functional requirements for electrical and/or airflow continuity. Gaps that interfere with the electrical and/or airflow continuity functions between component surfaces may be undesirable.

As such, a gap may impinge on the performance of the aircraft. To alleviate these detrimental influences on performance, seals may be used on aircraft. The advantageous embodiments also recognize that modifications to current seal designs are needed in order to enhance these and other performance aspects of aircraft design, service and performance. Currently available seals for certain folding wing aircraft are made from traditional composite materials and are stiff through most of the length of the seal and bends only at or near the tip of the seal.

The different advantageous embodiments recognize that currently used seals reduce or eliminate the gap through the use of a complex hinge mechanism that may cause the outboard wing section to move in a compound motion. A compound motion includes, for example, a linear motion and a rotational motion. These compound motions may be required to enable the knife-seal design owing to the need to simultaneously maintain aeroelastic rigidity and be compliant enough to prevent gaps during maneuvers. These types of mechanisms require complex hinged mechanisms and may reduce the volume of usable space within the aircraft. Further, these types of hinges may be more expensive and require more maintenance.

Thus, the different advantageous embodiments provide a method and apparatus for reducing and/or eliminating gaps. A first structure and a second structure may be present in which the second structure has a position adjacent to the first structure such that the first structure is not in contact with the second structure. An activated seal is attached to at least one of the first and second structure.

The activated seal has a variable stiffness that may be changed in response to a stimuli. The activated seal is capable of being deformed when at least one of the first structure and the second structure are moved relative to each other. In these examples, the stimuli may change the variable stiffness of the activated seal from being substantially rigid to substantially compliant or pliable. In this manner, movement of the first structure and second structure may occur in a manner such that the activated seal may be deformed. Being deformed means that the activated seal may be bent, folded, or otherwise changed in shape.

Figure 3:
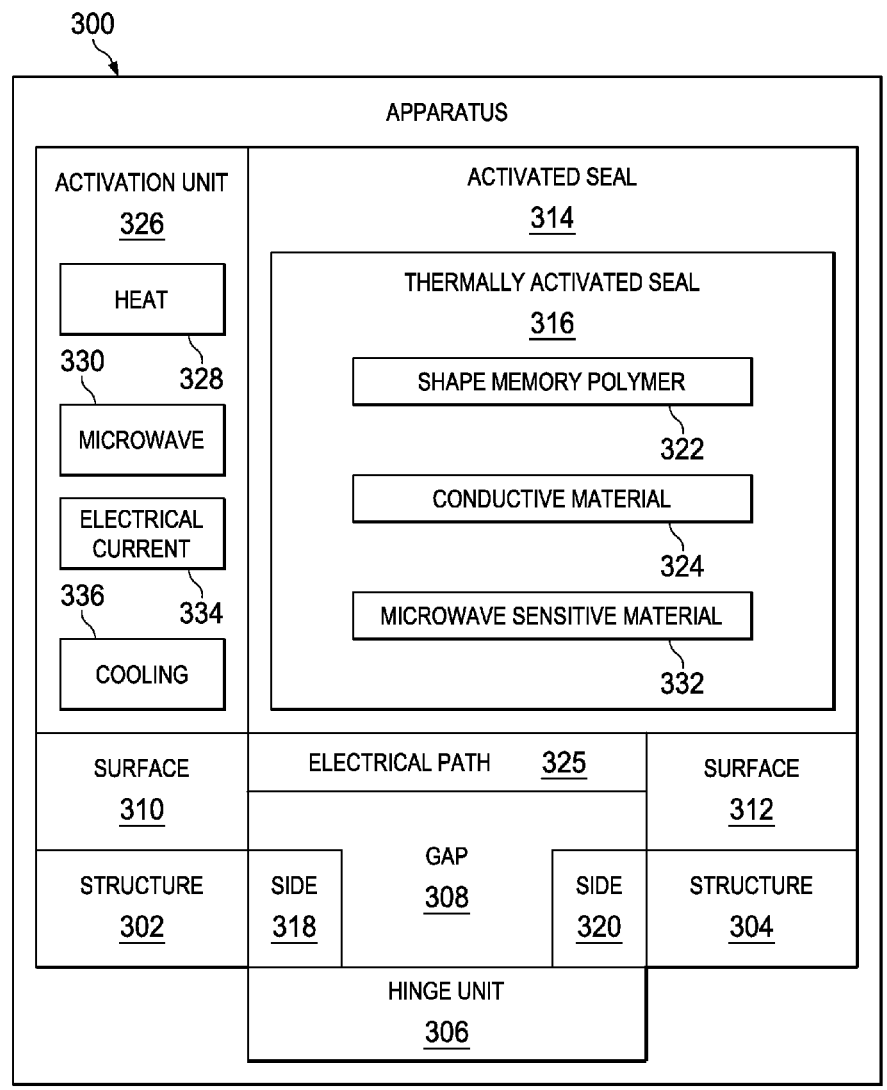
FIG. 3 is a block diagram illustrating the use of activated seals in accordance with an advantageous embodiment.

With reference now to FIG. 3, a block diagram illustrating the use of activated seals is depicted in accordance with an advantageous embodiment. In this example, apparatus 300 includes structure 302, structure 304, and hinge unit 306. Apparatus 300 may take various forms. For example, apparatus 300 may be, for example, an aircraft, a spacecraft, a submarine, a ship, a building, a power plant, or some other suitable apparatus.

Structure 302 and structure 304 are components within apparatus 300. For example, structure 302 and structure 304 may be different parts of a wing, if apparatus 300 takes the form of an aircraft, such as an outboard wing and an inboard wing for a folding wing. Structure 302 and structure 304 may move relative to each other. In this example, the movement of structure 302 and structure 304 may be facilitated using hinge unit 306.

Of course, other mechanisms may be used to move structure 302 and structure 304 relative to each other. For example, structure 302 and structure 304 may be components in a flight actuated door, a maintenance hatch, an inlet, a nozzle, an aero-controlled control surface, a wing fold, a wing sweep, and other suitable components.

In these illustrative examples, it may be desirable to reduce and/or eliminate gap 308 between structure 302 and structure 304 in operation. This reduction or elimination of gap 308 reduces the aerodynamic drag on surface 310 of structure 302 and surface 312 of structure 304 that may be caused by gap 308.

This aerodynamic drag may be reduced through the use of activated seal 314. Activated seal 314 may reduce or eliminate gap 308 by covering gap 308. In these examples, activated seal 314 may be attached to structure 302 and/or structure 304. As used herein, the phrase "at least one of", when used with a list of items, means that different combinations one or more of the items may be used and only one of each item in the list may be needed. For example, "at least one of item A, item B, and item C" may include, for example, without limitation, item A, or item A and item B. This example also may include item A, item B, and item C, or item B and item C.

In other advantageous embodiments, activated seal 314 may be used to fill gap 308, in which thermally activated seal 316 is connected to at least one of side 318 of structure 302 and side 320 of structure 304.

In the different advantageous embodiments, activated seal 314 may have a variable stiffness. In other words, the stiffness of activated seal 314 may change in response to some stimuli.

In these illustrative examples, activated seal 314 takes the form of thermally activated seal 316.

The stiffness of thermally activated seal 316 may change as the temperature changes. In the different advantageous embodiments, thermally activated seal 316 may be substantially rigid at a first temperature while being substantially compliant at a second temperature. When in the substantially compliant state, activated seal 314 and thermally activated seal 316 may move or bend as structure 302 and structure 304 move relative to each other.

By moving relative to each other, structure 302 may move while structure 304 remains motionless. Alternatively, structure 304 may move while structure 302 remains motionless. In yet another advantageous embodiment, both structure 302 and structure 304 may move relative to each other at the same time.

In these examples, thermally activated seal 316 may be comprised of shape memory polymer 322. Shape memory polymer 322 is a type of smart material that has one or more properties that may be changed in a controlled fashion. In these examples, shape memory polymer 322 may change in stiffness based on temperature. Shape memory polymer 322 may also be referred to as a thermal responsive or temperature responsive polymer which may undergo changes depending on the temperature.

Of course, in other advantageous embodiments, shape memory polymer 322 may change properties based on other stimuli such as, for example, without limitation, stress, moisture, Ph, electrical fields, magnetic fields, or some other suitable stimuli.

Further, thermally activated seal 316 may include conductive material 324. Conductive material 324 may create a conductive path between structure 302 and structure 304 if electrical and electromagnetic performance is needed. In other words, thermally activated seal 316 may provide electrical path 325 between structure 302 and structure 304 using conductive material 324.

Electrical path 325 may allow for various electrical signals and/or currents to be passed from structure 302 to structure 304. Conductive material 324 may take various forms. For example, without limitation, conductive material 324 may be a set of wires, conductive materials formed in a matrix, or some other suitable conductive material.

In these examples, thermally activated seal 316 may be activated by temperature changes. Activation unit 326 may provide the stimuli to change the stiffness of thermally activated seal 316. The increase in temperature places thermally activated seal 316 into a substantially pliable state.

In these illustrative examples, activation unit 326 applies stimuli in the form of heat 328 to change the temperature of thermally activated seal 316. In this example, activation unit 326 is located externally to activated seal 314. In other advantageous embodiments, activation unit 326 or a portion of activation unit 326 may be located within thermally activated seal 316.

Activation unit 326 may change the temperature in thermally activated seal 316 using a number of different mechanisms other than through heat 328. In other examples, activation unit 326 may generate microwave 330 and direct microwave 330 into thermally activated seal 316. Thermally activated seal 316 also may include microwave sensitive material 332, which may heat up when exposed to microwave 330.

Thermally activated seal 316 may include light, moisture, or chemical absorptive material similar to microwave sensitive material 332, which may heat up when exposed to these stimuli. This heat may then change the stiffness of thermally activated seal 316. In other advantageous embodiments, activation unit 326 may send electrical current 334 through activated seal 314 to change the temperature of thermally activated seal 316.

In these examples, as the temperature of activated seal 314 increases, the stiffness of activated seal 314 decreases. The stiffness may decrease to a point in which thermally activated seal 316 has a substantially compliant state in which activated seal 314 may bend or deform as structure 302 and structure 304 move.

Once structure 302 and/or structure 304 have finished moving, thermally activated seal 316 may have its temperature reduced to increase the stiffness of thermally activated seal 316. The reduction in temperature of thermally activated seal 316 may occur through normal cooling by exposure to ambient temperatures around thermally activated seal 316. In other advantageous embodiments, activation unit 326 may include cooling 336 to actively cool thermally activated seal 316. Cooling 336 may be induced or transmitted to thermally activated seal 316 through a refrigeration unit or some other cooling device.

At a selected temperature, thermally activated seal 316 may reach a substantially rigid state. This state may provide increased aerodynamic performance for surface 310 and surface 312 by covering gap 308. When thermally activated seal 316 is in a rigid state, thermally activated seal 316 also may provide an ability to transfer a load between structure 302 and structure 304. For example, a load may be transferred from a wing to a fuselage using thermally activated seal 316. Thermally activated seal 316 may be heated again when movement of structure 302 and/or structure 304 is desired.

In addition to being activated through different mechanisms, activated seal 314 may take various structural forms. For example, activated seal 314 may be, for example, without limitation, a cantilevered flap, a stretchable seal, a folding seal, a gasket type seal, or some other suitable type of seal.

The illustration of apparatus 300 in FIG. 3 is presented for purposes of illustrating different features for different advantageous embodiments. This example is not meant to imply physical or architectural limitations to the manner in which different features may be implements.

For example, activated seal 314 may be a two-part thermally activated seal in which different ends of the thermally activated seal may engage each other and maintain rigidity and engagement in a stiffened state. These two parts may become deformable when the temperature of activated seal 314 is increased to allow these parts to disengage from each other. Also, activated seal 314 may take other forms other than thermally activated seal 316. For example, activated seal 314 may be activated based on changes in electromagnetic fields applied to activated seal 314.

Figure 4:
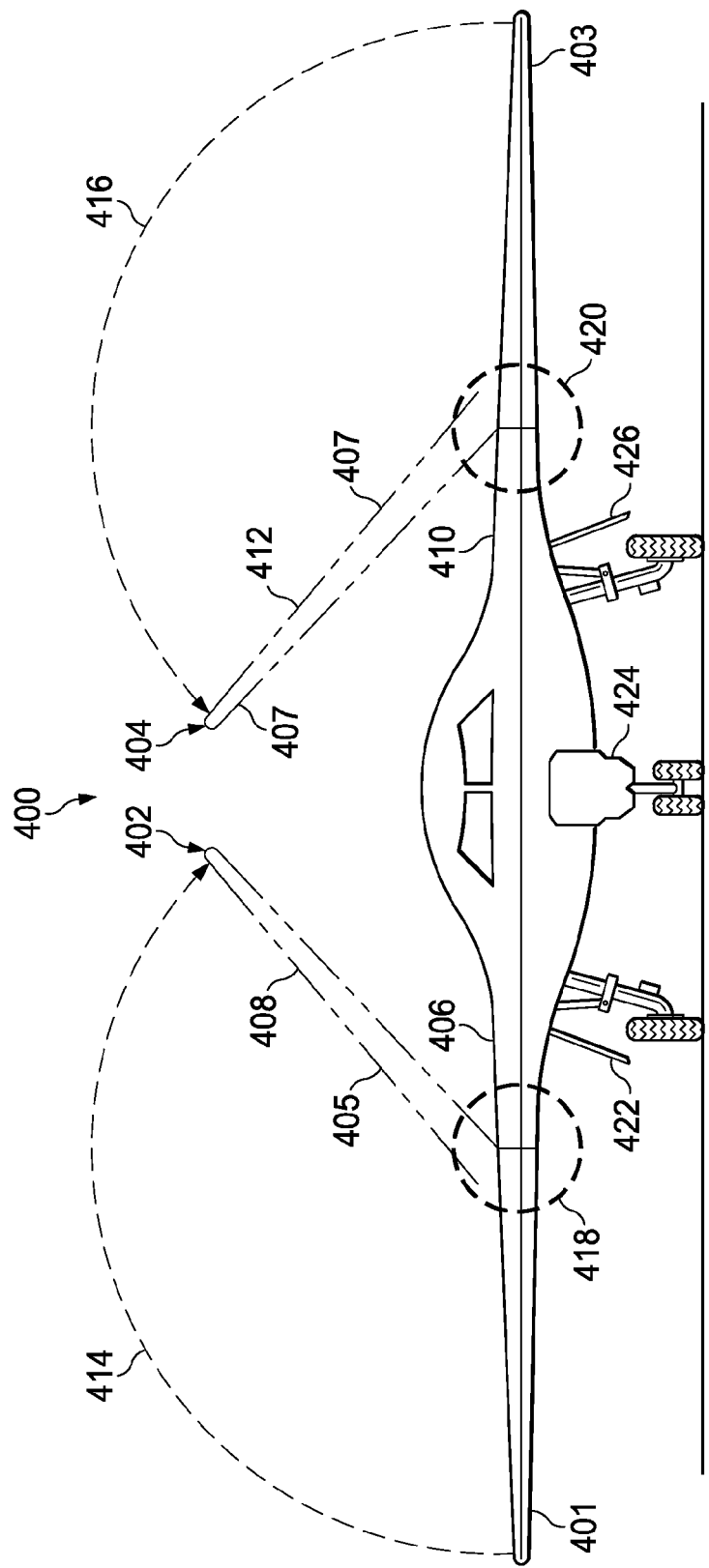
FIG. 4 is a diagram of an aircraft in accordance with an advantageous embodiment.

With reference now to FIG. 4, a diagram of an aircraft is depicted in accordance with an advantageous embodiment. In this example, aircraft 400 is an example of one implementation of apparatus 300 in FIG. 3. In this example, aircraft 400 has foldable wings 402 and 404. Foldable wing 402 includes inboard wing structure 406 and outboard wing structure 408. Foldable wing 404 includes inboard wing structure 410 and outboard wing structure 412. Outboard wing structures 408 and 412 are movable as indicated by arrows 414 and 416.

Foldable wings 402 and 404 may include deployed positions 401 and 403 and stowed positions 405 and 407. Foldable wings 402 and 404 may include seals at locations 418 and 420. These seals may take the form of thermally activated seal 316 in FIG. 3. For example, thermally activated seals may be used on the upper and lower surface of foldable wings 402 and 404 at these locations. Also, thermally activated seals may be used in other locations for aircraft 400. These locations include, for example, without limitation, in-flight landing gear doors 422, 424, and 426.

By using activated seals that employ shape memory polymers, gaps in these different locations in aircraft 400 are reduced or covered. With currently used seals, a gap may occur because the knife edge of the flap in the seal may be too compliant. As a result, preloading is lost and the seal deflects off the surface of outboard wing structures 408 and 412.

The different advantageous embodiments employ activated seals that prevent and/or reduce gap formation. The activated seals may decouple the high stiffness needed in-flight for the highly compliant or pliable deformation behavior needed during folding of foldable wings 402 and 404.

These types of seals, in the advantageous embodiments, do not need to be thinned out or use a knife shape as with currently available seals. Also, activated seals also may provide electrical continuity between outboard wing structures and inboard wing structures.

In the different advantageous embodiments, the activated seals are thermally activated seals. These types of seals may be heated to reduce the stiffness and increase the reversible deformation of the seal during folding of foldable wings 402 and 404 into a stowed position as shown by positions 405 and 407 from a deployed position as shown by positions 401 and 403 for foldable wings 402 and 404.

Once the wings are folded to the stowed position as shown in positions 405 and 407, the seals may cool down and remain in the bent state with a substantially stiff state. When foldable wings 402 and 404 are to be deployed, these seals may be reheated to allow the wings and the seals to move as foldable wings 402 and 404 move back into positions 401 and 403.

After foldable wings 402 and 404 are back into the deployed position, the seals may cool down and return to a substantially stiff state to provide the electrical and/or aerodynamic loading features desired during flight. With the use of these thermally activated seals, these seals may remain in place to prevent gap formation.

The illustration of the activated seals on aircraft 400 in FIG. 4 is presented as one manner in which activated seals may be employed to seal and/or prevent gap formation between structures or within structures. Other advantageous embodiments may be employed in other types of apparatus other than aircraft. For example, activated seals may be used in structures such as, for example, without limitation, submarines, spacecraft, power plants, cars, dams, and other suitable structures.

In FIGS. 5-27 illustrations of different types of seals and different configurations of seals are depicted in accordance with an advantageous embodiment. These illustrations are provided as examples of how different designs for activated seals may be used to reduce and/or prevent gap formation. These illustrations are not meant to limit the manner in which other advantageous embodiments may be implemented.

Figure 5:
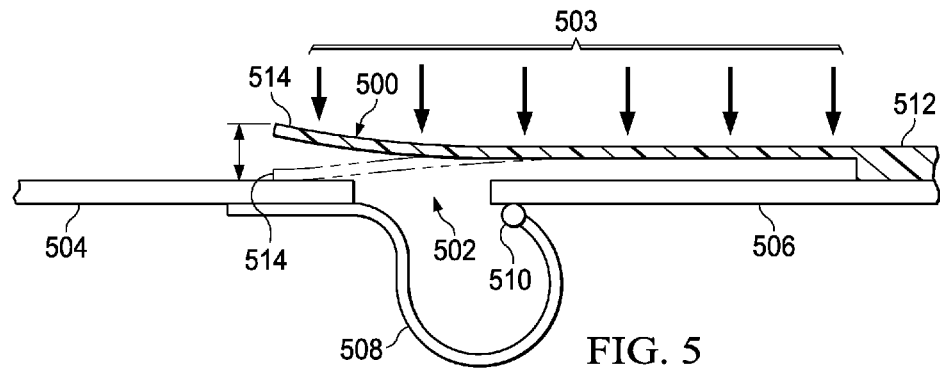
FIG. 5 is a diagram illustrating a bending seal in accordance with an advantageous embodiment.

With reference now to FIG. 5, a diagram illustrating a bending seal is depicted in accordance with an advantageous embodiment. In this example, bending seal 500 is an example of one implementation of thermally activated seal 316 in FIG. 3.

In this example, bending seal 500 serves to cover a potential gap 502 due to aeroload 503 between outboard wing structure 504 and inboard wing structure 506. Although aeroload 503 is shown downward, in this example, aeroload 503 may also be upward depending on the situation. Outboard wing structure 504 and inboard wing structure 506 are examples of wing structures for foldable wings such as, for example, foldable wings 402 and 404 in FIG. 4. Outboard wing structure 504 is connected to inboard wing structure 506 through hinge mechanism 508. Hinge mechanism 508 pivots around pivot point 510.

In this illustrative example, bending seal 500 is attached to inboard wing structure 506 at end 512. End 514 is not attached to outboard wing structure 504 in this example.

Bending seal 500, outboard wing structure 504, and inboard wing structure 506 are shown in a deployed state in FIG. 5. In this example, bending seal 500 may have a curved shape using curved material embedded within bending seal 500. As a result, in a high defamation state, bending seal 500 may touch outboard wing structure 504 as shown in position 514.

Figure 6:
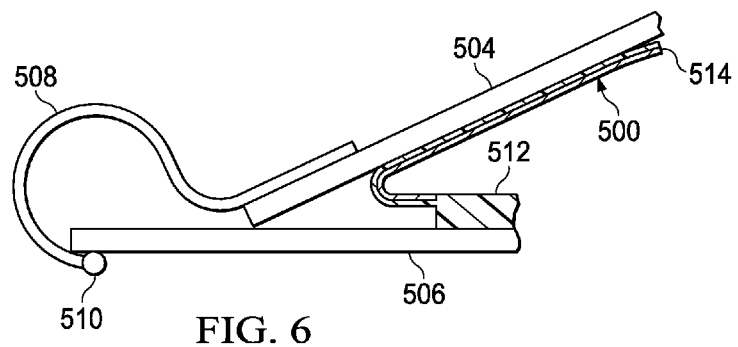
FIG. 6 is a stowed position of a bending seal in accordance with an advantageous embodiment.

With reference now to FIG. 6, a stowed configuration of a bending seal is depicted in accordance with an advantageous embodiment. Bending seal 500 may slide against outboard wing structure 504 when outboard wing structure 504 moves relative to inboard wing structure 506. In this configuration, bending seal 500, outboard wing structure 504, and inboard wing structure 506 are shown in a stowed configuration. In this configuration, bending seal 500 may be in a substantially compliant form allowing bending seal 500 to bend and slide along outboard wing structure 504.

Bending seals may include composite reinforcements to reduce maintenance needs in which these seals may need to be replaced. These reinforcements may vary in size and spacing across the length of or width of the bending seal.

Figure 7:
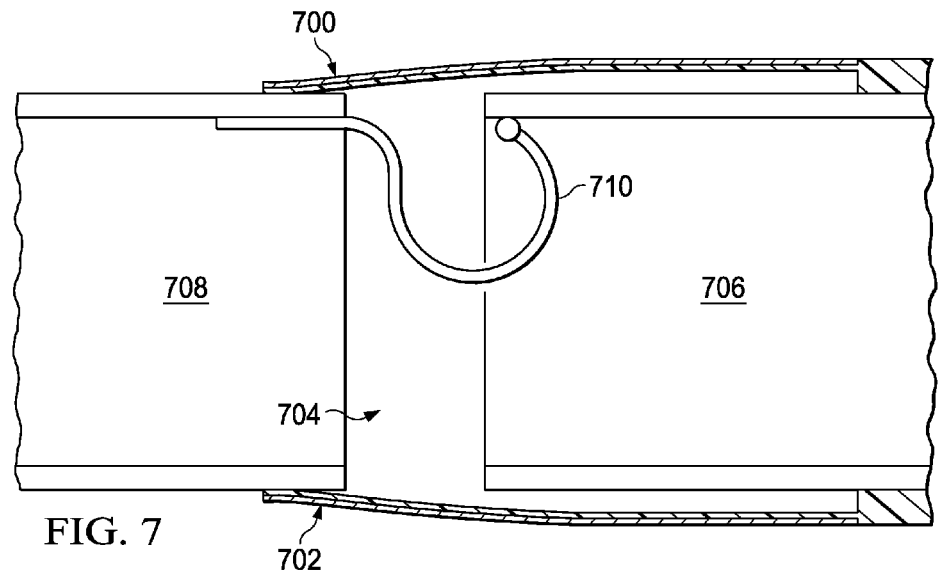
FIG. 7 is a diagram illustrating a cutaway view of a top and bottom seal in a deployed position in accordance with an advantageous embodiment.

With reference now to FIG. 7, a diagram illustrating a cutaway view of a top and bottom seal in a deployed position is depicted in accordance with an advantageous embodiment. Bending seal 700, seal 702, outboard wing 708, and inboard wing 706 are in a deployed configuration in this illustration.

Bending seal 700 and seal 702 covered gap 704 between inboard wing structure 706 and outboard wing structure 708. Outboard wing structure 708 may move relative to inboard wing structure 706 through hinge mechanism 710. Bending seal 700 and seal 702 are connected to inboard wing structure 706. Neither of these seals is connected to outboard wing structure 708 in this example.

Bending seal 700 may be a thermally activated seal in these examples. Bending seal 700 is depicted in a substantially stiffened state. Seal 702 may be a normal composite seal using standard composite materials. In other examples, seal 702 also may be a thermally activated seal.

Figure 8:
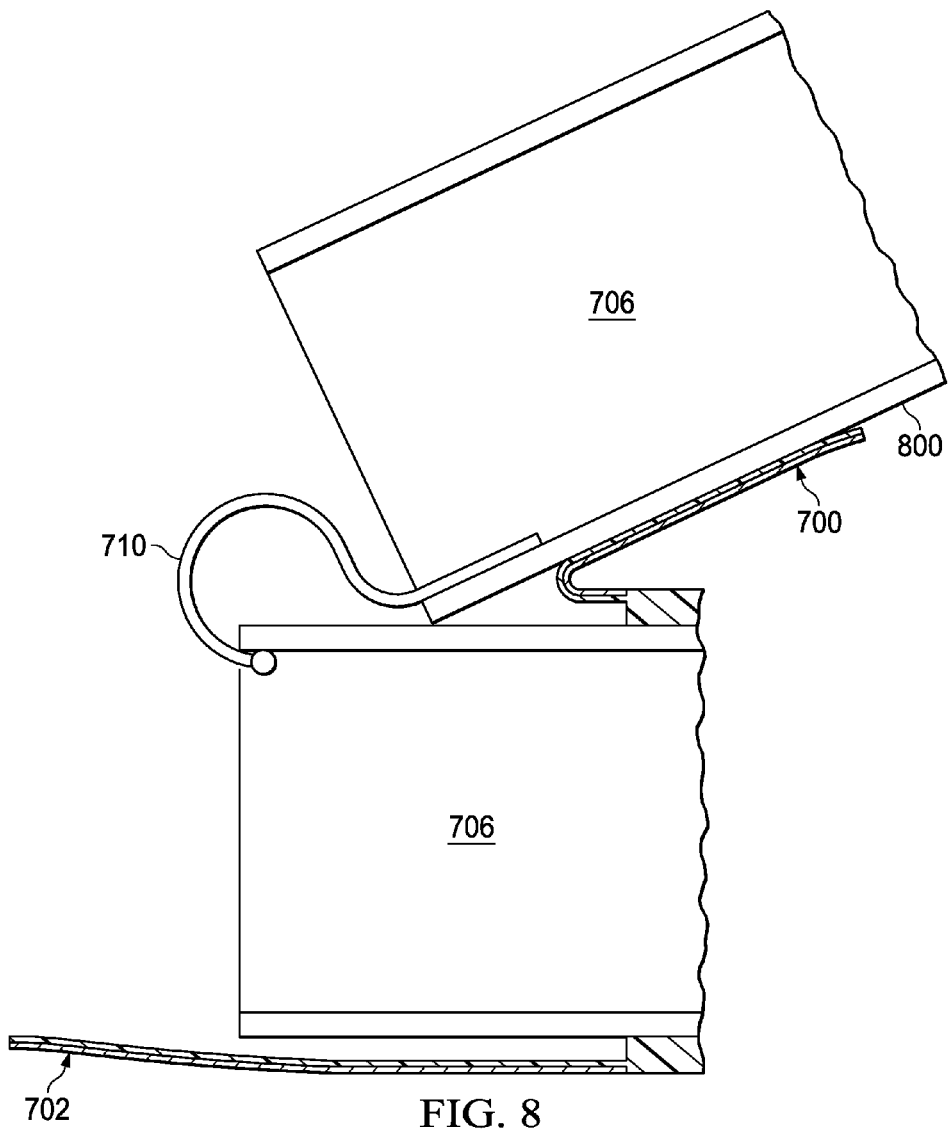
FIG. 8 is a diagram illustrating a cutaway view of top seal and a bottom seal for a wing structure in a stowed position in accordance with an advantageous embodiment.

With reference now to FIG. 8, a diagram illustrating a cutaway view of top seal and a bottom seal for a wing structure in a stowed position is depicted in accordance with an advantageous embodiment. In FIG. 8, bending seal 700, seal 702, outboard wing structure 708, and inboard wing structure 706 are shown in a stowed position. As can be seen, seal 702 may slide along surface 800 of outboard wing structure 708.

Figure 9:
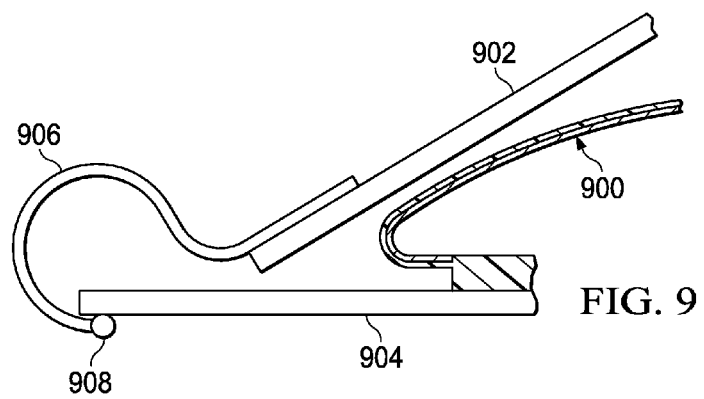
FIG. 9 is a diagram illustrating an example of a bending seal in accordance with an advantageous embodiment.

With reference now to FIG. 9, a diagram illustrating an example of a bending seal is depicted in accordance with an advantageous embodiment. In this example, bending seal 900 is shown in a stowed position with respect to outboard wing structure 902 and inboard wing structure 904. Outboard wing structure 902 may be folded into the stowed position using hinge mechanism 906, which may pivot around pivot point 908.

Bending seal 900 is an example of one implementation of thermally activated seal 316 in FIG. 3 after heating bending seal 900 into a substantially pliable state may have an actuator bend the seal so that bending seal 900 does not touch and/or rub against outboard wing structure 902 when outboard wing structure 902 moves from a deployed position to a stowed position with respect to inboard wing structure 904.

One implementation of such an actuator is embedded shape memory alloy wires. Another implementation is the use of a linear actuator to pull embedded wires or strips off the composite's neutral axis. In other words, bending seal 900 bends after heating to a compliant configuration and actuated such that the seal is bent out of the path of moving outboard wing structure 902.

In this manner, deformation of bending seal 900 may occur in a more controlled fashion. Deformation means that bending seal 900 may be changed in shape and/or form. Deformation may include, for example, bending, folding, compression, or other types of changes in the shape of bending seal 900. In these examples, bending seal 900 only bends when it deforms. In other advantageous embodiments, other deformations may occur depending on the particular design for the seal.

This deformation may pull bending seal 900 out of the way of outboard wing structure 902. This type of movement prevents rigid body contact and reduces rubbing, friction, and/or other wear that may occur if bending seal 900 were to touch and/or rub against outboard wing structure 902 during movement of outboard wing structure 902. This design may ease the design of hinge mechanism 906.

Currently, a preloaded seal may require a hinge designed with a path motion that is initially downward and out before outboard wing structure 902 folds with inward rotation towards inboard wing structure 904. This type of added translation currently used wing systems may increase the size and complexity of hinge mechanism 906. Generally thermally activated seals used in the different advantageous embodiments reduce and/or eliminate the need for these types of hinge mechanisms.

Figure 10:
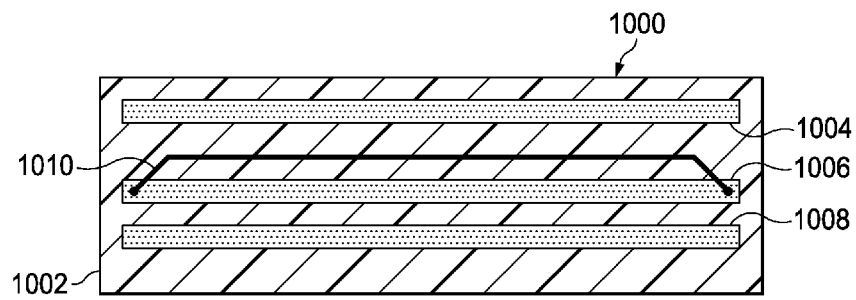
FIG. 10 is a diagram of a cross-section of a bending seal in accordance with an advantageous embodiment.

With reference now to FIG. 10, a diagram of a cross-section of a bending seal is depicted in accordance with an advantageous embodiment. In this example, bending seal 1000 is a cross-section of bending seal 900 in FIG. 9. Bending seal 1000 is an example of one implementation for thermally activated seal 316 in FIG. 3. As can be seen, in this example, bending seal 1000 may include shape memory polymer matrix 1002 located around composite materials, such as carbon fibers in layers 1004, 1006, and 1008. Layers 1004, 1006, and 1008 may form a preform or structure for shape memory polymer matrix 1002.

Further, shape memory alloy wire 1010 may be present. Shape memory alloy wire 1010 may cause bending seal 1000 to curve in the shape shown in FIG. 9 when heat is applied to bending seal 900 in FIG. 9. Heat applied to bending seal 1000 causes shape memory polymer matrix 1002 to become pliable.

This heat also causes shape memory alloy wire 1010 to actuate by shortening itself inducing a bent shape in the bending seal 1000. Shape memory alloy wire 1010 may deform or change shape through its phase transformation temperature. When shape memory alloy wire 1010 cools through its phase transformation temperature, this wire returns to a straight shape. In this manner, bending seal 1000 may change shape in response to changes in the shape or length of shape memory alloy wire 1010.

Consequently, bending seal 900 in FIG. 9 may bend and clear outboard wing structure 904 in FIG. 9 in a manner that may reduce damage, wear, and/or excessive bending of bending seal 900 in FIG. 9.

Figure 11:
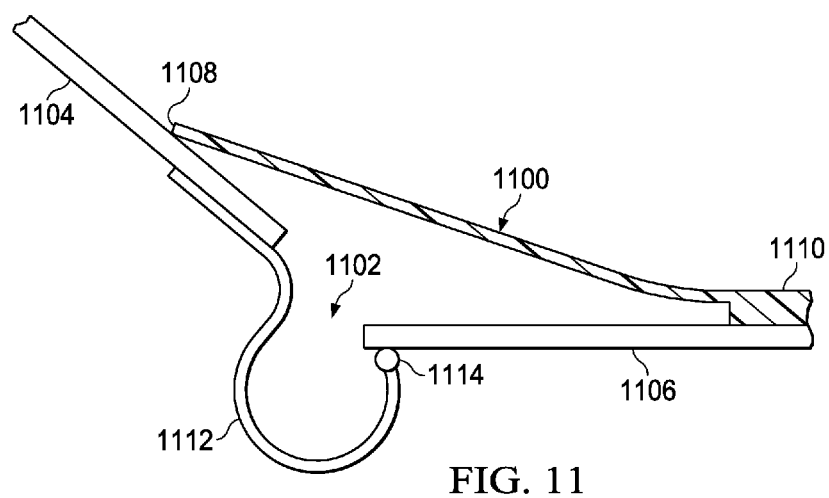
FIG. 11 is a diagram of a stretching seal in accordance with an advantageous embodiment.

With reference now to FIG. 11, a diagram of a stretching seal is depicted in accordance with an advantageous embodiment. In this example, stretching seal 1100 may be implemented using a thermally activated seal, such as thermally activated seal 316 in FIG. 3.

Stretching seal 1100 covers gap 1102 between outboard wing structure 1104 and inboard wing structure 1106. Stretching seal 1100 is connected to outboard wing structure 1104 at end 1108 and to inboard wing structure 1106 at end 1110. Outboard wing structure 1104 may move relative to inboard wing structure 1106 through hinge mechanism 1112. Hinge mechanism 1112 may allow outboard wing structure 1104 to move around point 1114.

Stretching seal 1100 may uniformly distribute axial strain along the length of stretching seal 1100. The axial strain is the strain within the plane of stretching seal 1100 in these examples. Stretching seal 1100 provides the capability to form in a stretching manner when in a pliable state. Stretching seal 1100 enters a substantially pliable state when heat is applied to stretching seal 1100.

Figure 23:
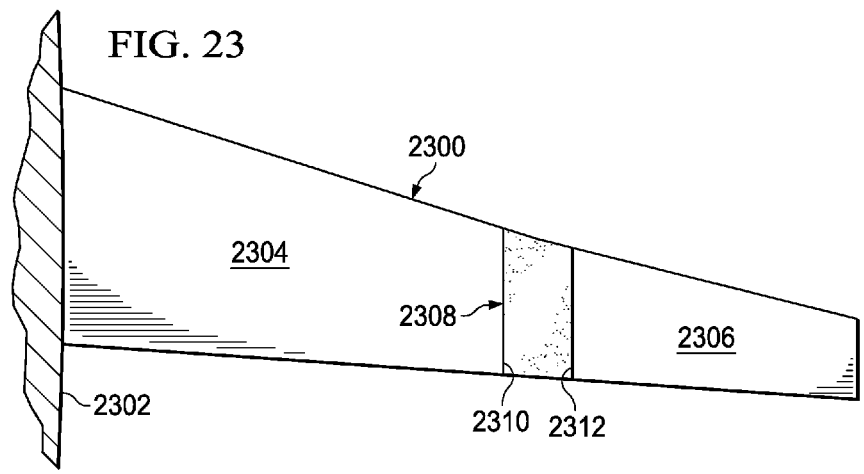
FIG. 23 is a diagram of an aircraft wing in accordance with an advantageous embodiment.
Figure 24:
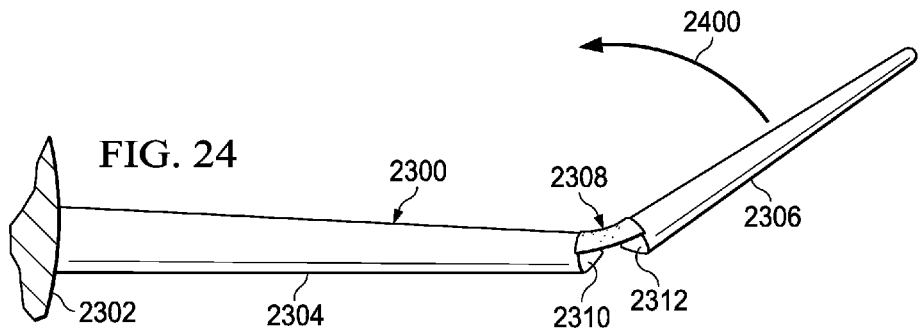
FIG. 24 is a diagram of front view of a wing in accordance with an advantageous embodiment.

Stretching seal 1100 does not have a bent or curved element to induce a normal preload in these examples. However, stretching seal 1100 may have an axial preload to increase the bending resistance of a stretching seal. This type of seal, however, may have spatially varying reinforcements in size and spacing to accommodate gap and deformation requirements, for example illustrated in FIG. 26. These reinforcements may accommodate a dual curvature which may occur from hinge rotation axis and wing chord curvature as shown in FIG. 23 and FIG. 24.

Further, this type of seal may accommodate tension and/or compression of stretching seal 1100 during extreme deformation. These deformations occur when outboard wing structure 1104 is deployed into a deployed position and moves into a stowed position relative to inboard wing structure 1106.

Figure 12:
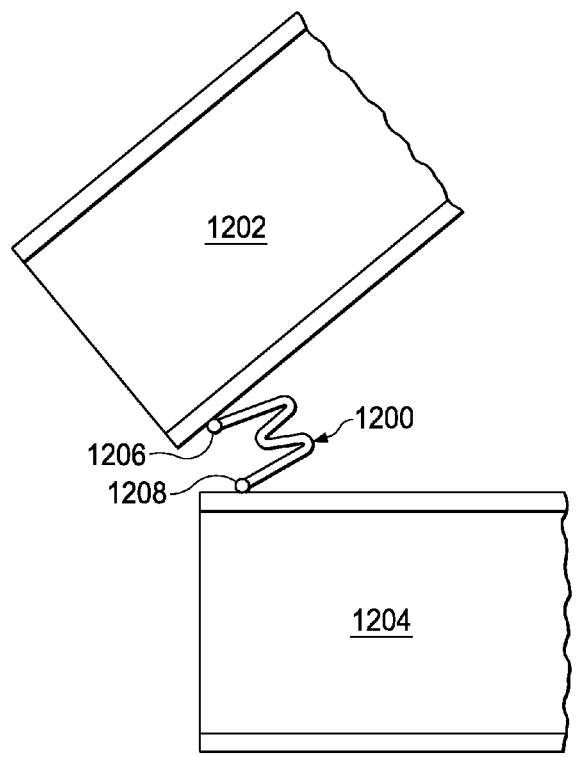
FIG. 12 is a diagram illustrating a folding seal in accordance with an advantageous embodiment.

With reference now to FIG. 12, a diagram illustrating a folding seal is depicted in accordance with an advantageous embodiment. Folding seal 1200 is an example of another implementation of thermally activated seal 316 in FIG. 3. In this example, folding seal 1200 is shown with outboard wing structure 1202 and inboard wing structure 1204 in a stowed configuration. Folding seal 1200 is attached to outboard wing structure 1202 at end 1206 and inboard wing structure 1204 at end 1208. As can be seen, folding seal 1200 folds when in a substantially pliable state.

Figure 13:
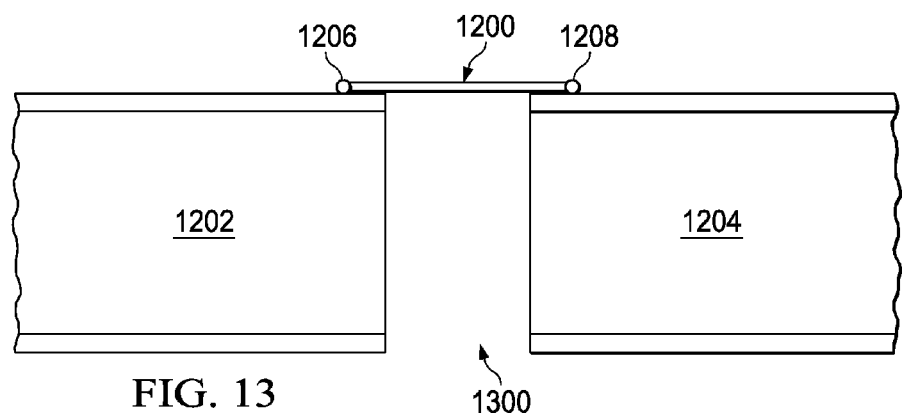
FIG. 13 is a diagram illustrating a folding seal in a deployed position in accordance with an advantageous embodiment.

With reference now to FIG. 13, a diagram illustrating a folding seal in a deployed position is depicted in accordance with an advantageous embodiment. In this example, outboard wing structure 1202 and inboard wing structure 1204 are shown in a deployed position. Folding seal 1200 covers gap 1300 in this configuration. Folds in folding seal 1200 are caused by zones of rigid embedded elements such as carbon fiber fabric present within folding seal 1200.

Figure 14:
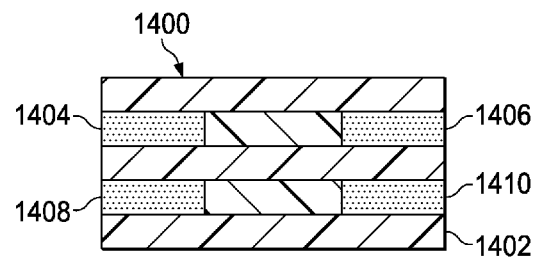
FIG. 14 is a cross-sectional view of a folding seal in accordance with an advantageous embodiment.

With reference now to FIG. 14, a cross-sectional view of a folding seal is depicted in accordance with an advantageous embodiment. In this example, folding seal 1400 is a cross-sectional view of a portion of folding seal 1200 in FIG. 12. Folding seal 1400 includes shape memory polymer 1402 with carbon fiber fabric sections 1404, 1406, 1408, and 1410.

These carbon fiber fabric sections are spaced within shape memory polymer 1402 to allow folding seal 1200 to fold in a manner illustrated in FIG. 12. The illustration of these carbon fiber sections is presented for purposes of showing one manner in which reinforcements may be arranged. Of course, other types of materials and other types of arrangements may be used, depending on the particular implementation.

Figure 15:
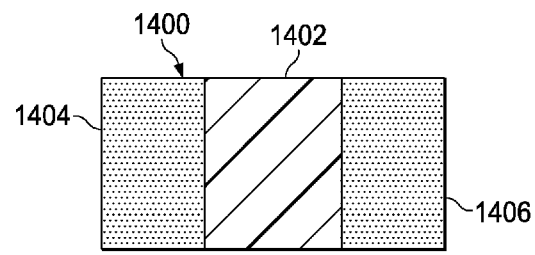
FIG. 15 is a top view of a folding seal in accordance with an advantageous embodiment.

With reference now to FIG. 15, a top view of a folding seal is depicted in accordance with an advantageous embodiment. In this example, a top view of folding seal 1400 is illustrated.

Figure 16:
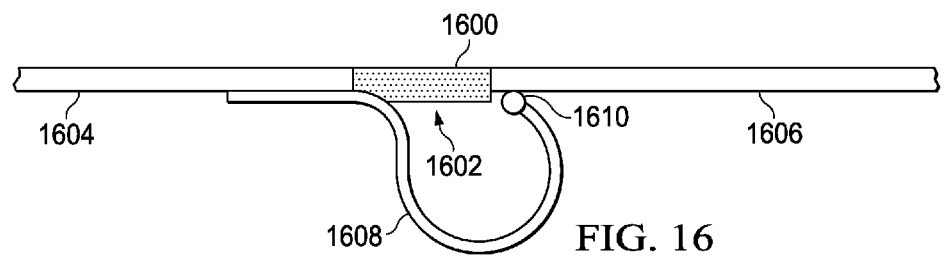
FIG. 16 is a diagram illustrating a compression gasket seal in accordance with an advantageous embodiment.

With reference now to FIG. 16, a diagram illustrating a compression gasket seal is depicted in accordance with an advantageous embodiment. Compression gasket seal 1600 is an example of one implementation of thermally activated seal 316 in FIG. 3. In this example, compression gasket seal 1600 covers or seals gap 1602 between outboard wing structure 1604 and inboard wing structure 1606. Outboard wing structure 1604 may move relative to inboard wing structure 1606 using hinge mechanism 1608. Outboard wing structure 1604 pivots around point 1610.

In this example, compression gasket seal 1600 has a single fixed boundary between outboard wing structure 1604 and inboard wing structure 1606. Compression gasket seal 1600 relies on compressive loads between these two wing structures in a deployed position and is substantially stiff, in this example, to prevent any gap formation.

Compression gasket seal 1600 is attached to either outboard wing structure 1604 or inboard wing structure 1606 in this example. In some advantageous embodiments, compression gasket seal 1600 may be a two piece seal in which the two pieces interlock. With a two piece seal, compression gasket seal 1600 is attached to both outboard wing structure 1604 and inboard wing structure 1606.

Figure 17:
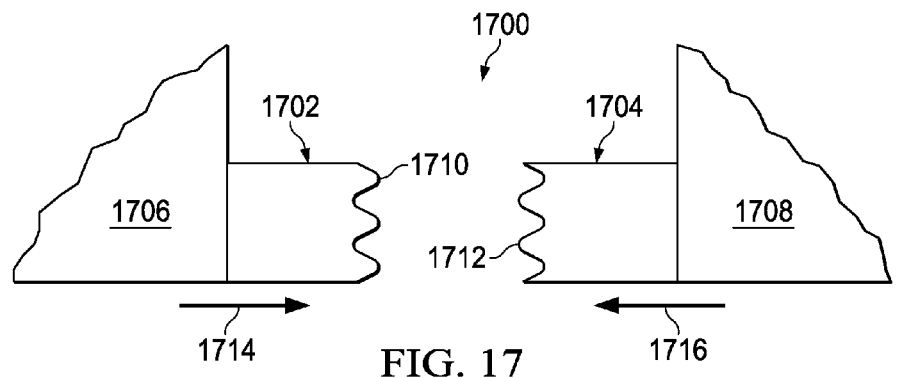
FIG. 17 is a diagram illustrating a two piece gasket seal in accordance with an advantageous embodiment.

With reference now to FIG. 17, a diagram illustrating a two piece gasket seal is depicted in accordance with an advantageous embodiment. Compression gasket seal 1700 is another example of an implementation of thermally activated seal 316 in FIG. 3. In this example, compression gasket seal 1700 includes part 1702 and part 1704. Part 1702 is connected to outboard wing structure 1706, while part 1704 is connected to inboard wing structure 1708. In this example, part 1702 contains interlocking section 1710, while part 1704 contains interlocking section 1712.

These interlocking sections may be, for example, interlocking posts or interlocking T's. Further, interlocking sections 1702 and 1704 may have a surface area that is sufficient to provide sealing when part 1702 and part 1704 are engaged with each other.

In these examples, part 1702 and part 1704 are in a substantially compliant state, while outboard wing structure 1706 moves in the direction of arrow 1714 and inboard wing structure 1708 moves in the direction of arrow 1716.

Figure 18:
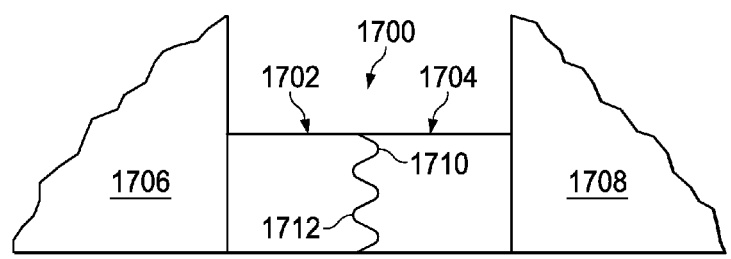
FIG. 18 is a diagram illustrating a compression gasket seal in an engaged configuration in accordance with an advantageous embodiment.

With reference now to FIG. 18, a diagram illustrating a compression gasket seal in an engaged configuration is depicted in accordance with an advantageous embodiment. In FIG. 18, interlocking section 1710 of part 1702 and interlocking section 1712 of part 1704 have engaged with each other and may cool, such that compression gasket seal 1700 becomes substantially stiff. In the substantially stiff state, interlocking section 1710 and interlocking section 1712 engage each other in a manner that a seal is created.

Figure 19:
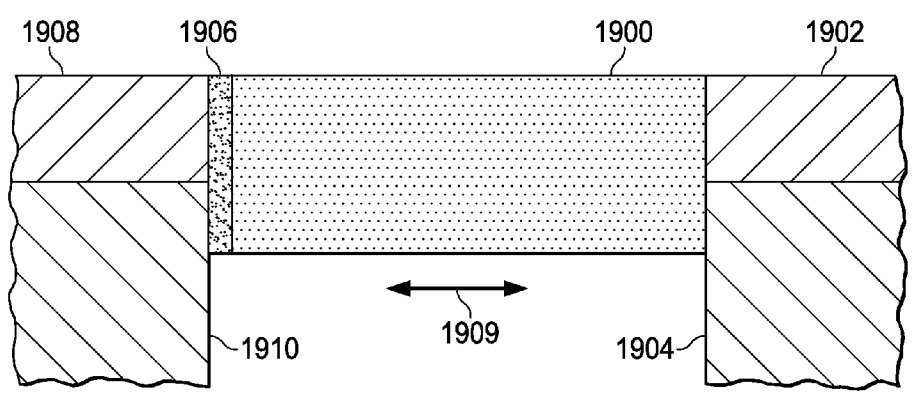
FIG. 19 is a diagram of a seal configuration in accordance with an advantageous embodiment.

With reference to FIG. 19, a diagram of a seal configuration is depicted in accordance with an advantageous embodiment. Compression seal 1900 is an example of one implementation for thermally activated seal 316 in FIG. 3.

In this example, compression seal 1900 is attached to inboard wing skin 1902 and inboard wing bulkhead 1904. Elastomer 1906 is attached to outboard wing skin 1908 and outboard wing bulkhead 1910. Elastomer 1906 is a compliant element in a load path as shown by arrow 1909. Further, elastomer 1906 may engage compression seal 1900 in a manner that gap formation may be prevented during extreme deformation of compression seal 1900 during flight. The use of elastomer 1906 and compression seal 1900 may allow for preloading along the load path to prevent gap formation between these wing structures.

Figure 20:
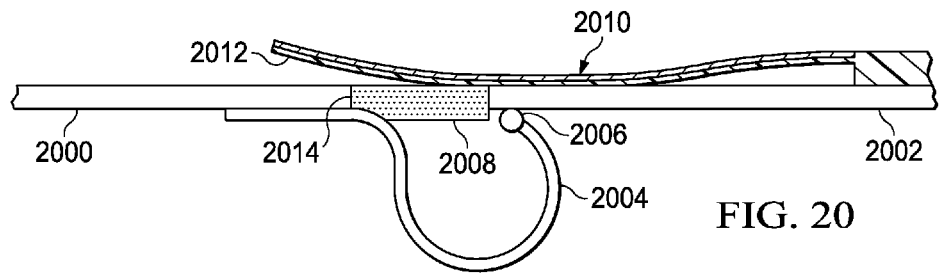
FIG. 20 is a diagram illustrating a seal configuration in accordance with an advantageous embodiment.

With reference now to FIG. 20, a diagram illustrating a seal configuration is depicted in accordance with an advantageous embodiment. In this example, outboard structure 2000 and inboard wing structure 2002 may move relative to each other using hinge unit 2004. The movement may pivot around point 2006 in these examples.

As illustrated, seal 2008 and seal 2010 are used. These seals are examples of implementations for thermally activated seal 316 in FIG. 3. Seal 2008 may take the form of a compression gasket seal, while seal 2010 may take the form of a bending seal. By combining these two different types of seals, additional load carrying capability, reduced risk of gap formation, additional pathways for electrical continuity, and other suitable features may be provided.

In this example, side 2012 of seal 2010 may include an engagement mechanism to engage side 2014 of seal 2008. These engagement mechanisms may include, for example, barbs, reversible attachments, reversible adhesive, interlocking elements, or some other suitable feature. These engagement mechanisms may allow for a rigid connection to be created between seal 2010 and seal 2008.

Figure 21:
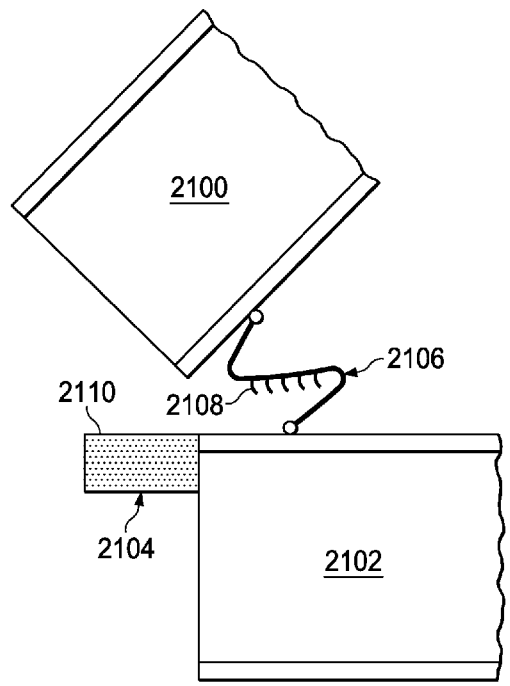
FIG. 21 is a diagram of a hybrid seal configuration in accordance with an advantageous embodiment.

With reference now to FIG. 21, a diagram of a hybrid seal configuration is depicted in accordance with an advantageous embodiment. Outboard wing structure 2100 is shown in a deployed position with respect to inboard wing structure 2102. In this example, outboard wing structure 2100 may move relative to inboard wing structure 2102. Compression gasket seal 2104 is an example of an implementation for thermally activated seal 316 in FIG. 3.

In this illustrative example, compression gasket seal 2104 is used in conjunction with fabric 2106. Fabric 2106 includes an engagement mechanism, such as reversible attachment barbs 2108. Reversible attachment barbs 2108 may engage and interlock with surface 2110 of compression gasket seal 2104 when compression gasket seal 2104 is substantially compliant.

Figure 22:
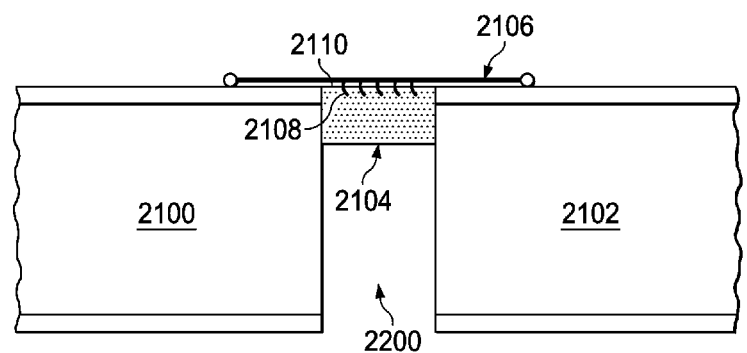
FIG. 22 is a diagram of a hybrid seal configuration in accordance with an advantageous embodiment.

With reference now to FIG. 22, a diagram of a hybrid seal configuration is depicted in accordance with an advantageous embodiment. In this example, outboard wing structure 2100 is in a deployed position with respect to inboard wing structure 2102. In FIG. 22, fabric 2106 and compression gasket seal 2104 cover gap 2200. As can be seen, in this example, reversible attachment barbs 2108 engage surface 2110 of compression gasket seal 2104.

With reference now to FIG. 23, a diagram of an aircraft wing is depicted in accordance with an advantageous embodiment. In this example, aircraft wing 2300 is connected to fuselage 2302. Aircraft wing 2300 includes inboard wing structure 2304 and outboard wing structure 2306. In this example, upper half seal 2308 may be a seal implemented using thermally activated seal 316 in FIG. 3. Upper half seal 2308 may be attached to edge 2310 of inboard wing structure 2304 and edge 2312 of outboard wing structure 2306.

With reference now to FIG. 24, a diagram of a front view of a wing is depicted in accordance with an advantageous embodiment. This view of aircraft wing 2300 and the view in FIG. 25 provide different perspectives of the dual curvature of seals that may be present.

In this example, the front view of aircraft wing 2300 is illustrated. As can be seen, from this view, upper half seal 2308 is located in the upper half of aircraft wing 2300. Outboard wing structure 2306 may move in the direction of arrow 2400 in which upper half seal 2308 may bend and maintain various features, such as an aerodynamic surface, loading, electrical continuity, and other desirable features.

Figure 25:
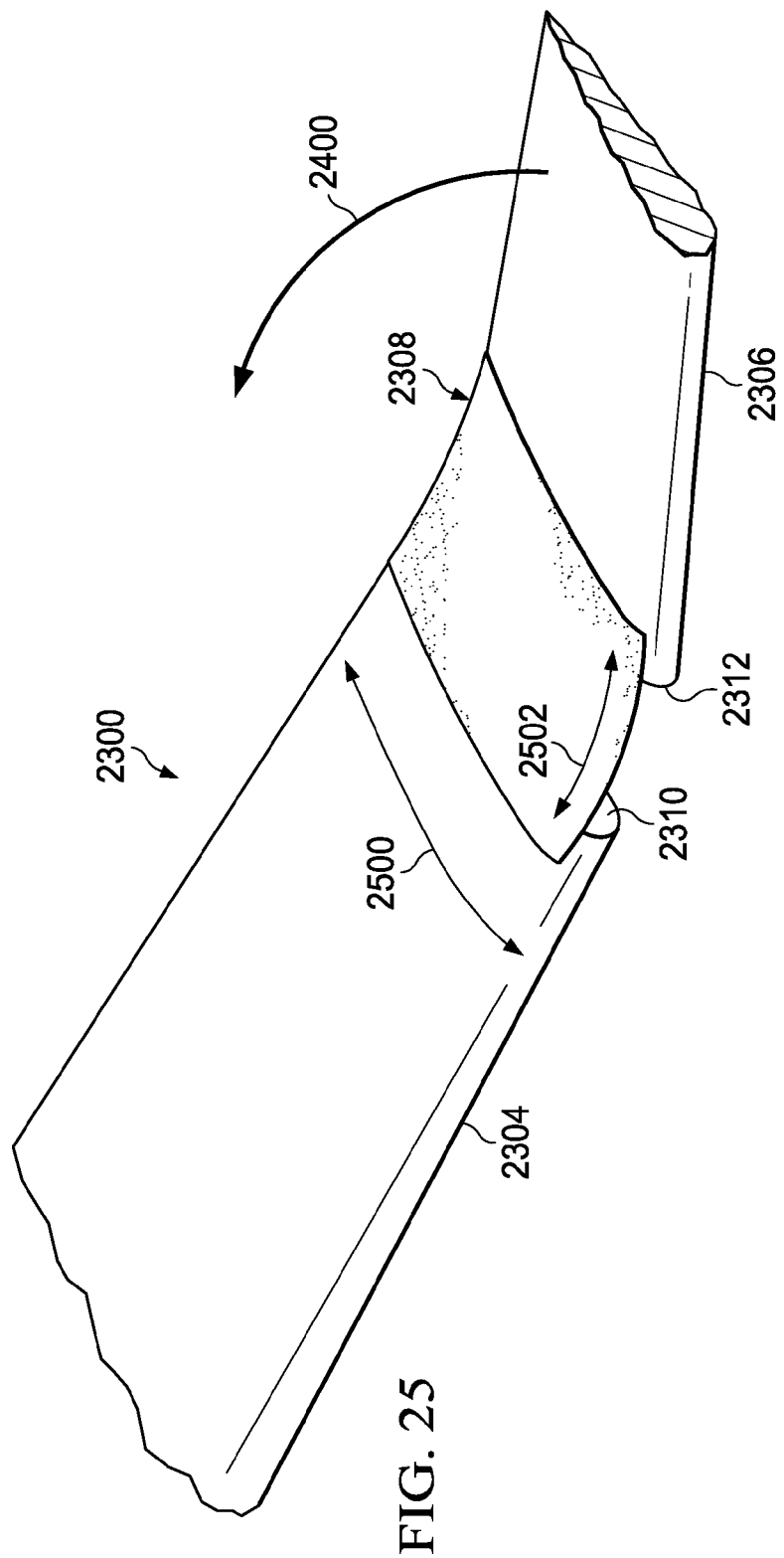
FIG. 25 is a diagram of a perspective view of a portion of a wing in accordance with an advantageous embodiment.

With reference now to FIG. 25, a diagram of a perspective view of a portion of a wing is depicted in accordance with an advantageous embodiment. In this example, a portion of aircraft wing 2300 is shown in a perspective view to illustrate the dual curvature or bending that may occur with respect to upper half seal 2308.

As can be seen, in this example, a chord-wise curvature is shown by arrow 2500, while a span-wise curvature is shown by arrow 2502. The chord-wise curvature shown by arrow 2500 may be caused by the shape of the chord of inboard wing 2304. The span-wise curvature shown by arrow 2502 may occur by outboard wing structure 2306 rotating in the direction of arrow 2400.

In this example, the wing chord direction is the first axis of curvature and the fold axis is the second axis of curvature. As can be seen, in these illustrations, upper half seal 2308 may be designed to accommodate both types of curvature during a wing fold operation. Upper half seal 2308 may be designed using a thermally activated seal that permits for optimized stiffness and strained distributions during flight and wing fold conditions.

Figure 26:
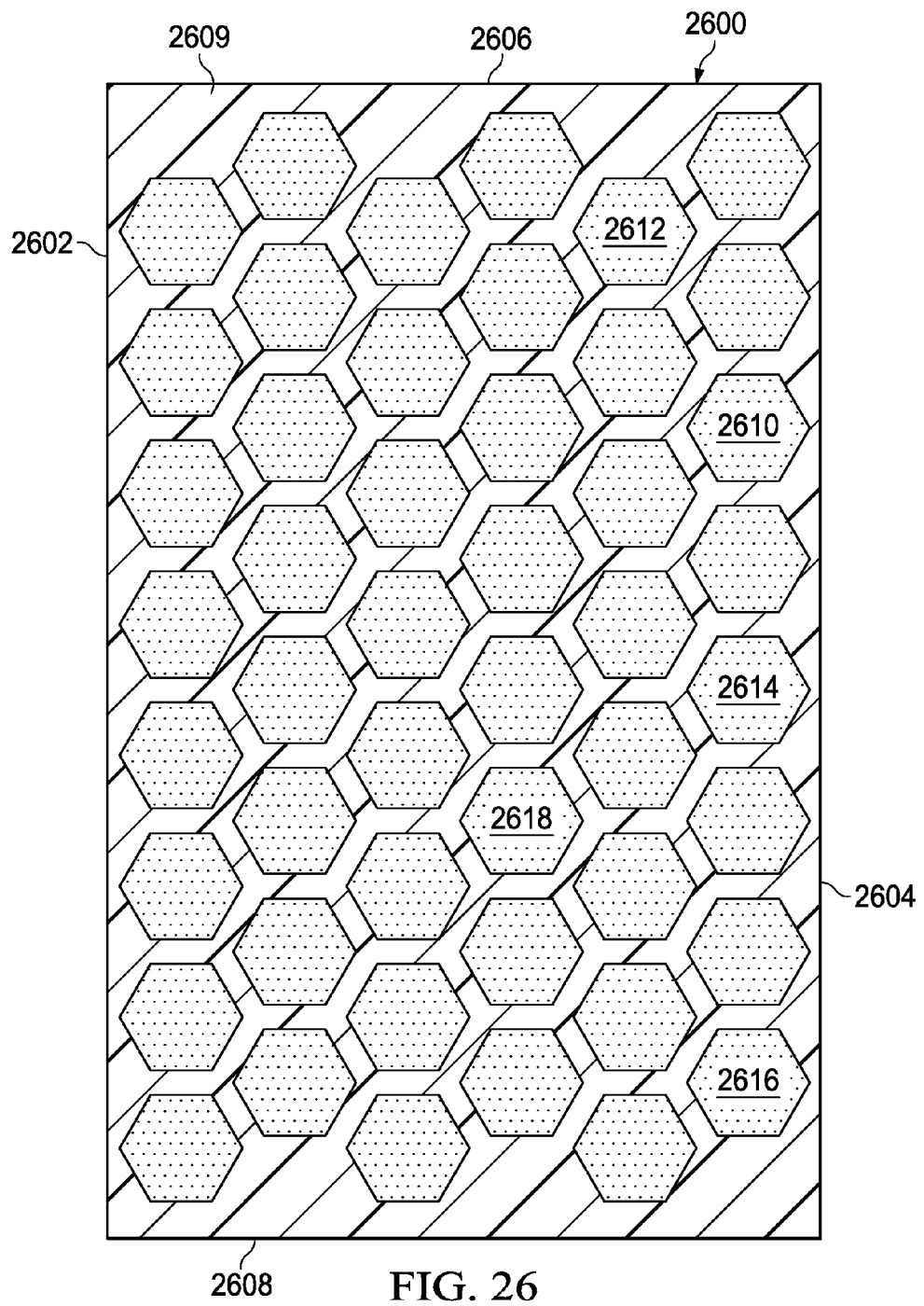
FIG. 26 is a diagram illustrating reinforcements in a seal in accordance with an advantageous embodiment.

With reference now to FIG. 26, a diagram illustrating reinforcements in an activated seal is depicted in accordance with an advantageous embodiment. In this example, seal 2600 is an example of one implementation for thermally activated seal 316 in FIG. 3. Seal 2600 may be connected to an outboard wing structure on edge 2602. Edge 2604 may be connected to an inboard wing structure, in these examples.

Edge 2606 is located on a trailing edge of the wing, while edge 2608 is located on a leading edge of the wing. In this example, seal 2600 may include shape memory polymer 2609 and reinforcements, such as reinforcements 2610, 2612, 2614, 2616, and 2618.

These and other illustrated reinforcements may be distributed within shape memory polymer 2609 to provide reinforcements to seal 2600. These reinforcements may be spaced in different concentrations in different areas of seal 2600 depending on the particular implementation. Areas on seal 2600 meeting higher strain may have wider reinforcement space between reinforcements, while other areas may have closer reinforcement spacing.

In these examples, high strain areas may be areas of high curvature and/or areas restricted by boundary conditions. As a result, wider spacing of reinforcements may provide for an ability to accommodate the rate of curvature or bending. Areas that require high stiffness may have narrow reinforcement spacing in which reinforcements may have a greater concentration in a same size area as compared to another area with a lower stiffness.

In these examples, the reinforcing material may be divided into around twenty-five reinforcements per inch to around five reinforcements per inch, depending on the reinforcement size, desired local stiffness, strain, and other parameters. Further, multiple layers of reinforcements, such as those illustrated, may be used. Around three to around twenty reinforcement layers may be used with shape memory polymer 2609 forming a matrix material between each layer.

Figure 27:
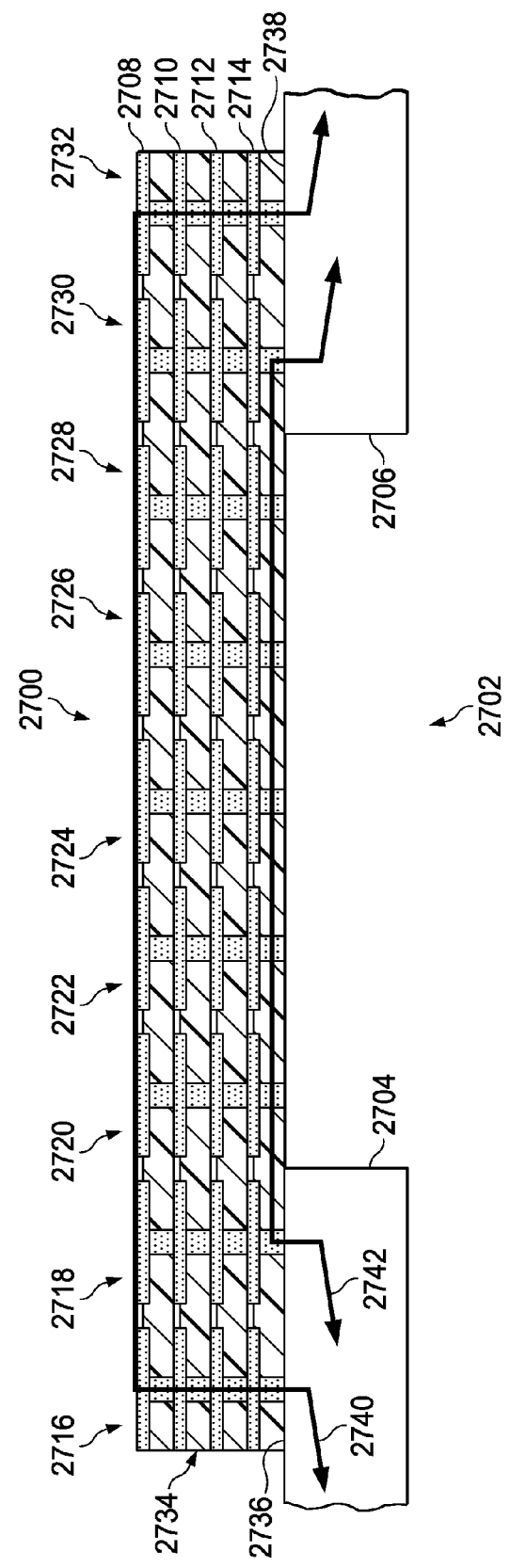
FIG. 27 is a diagram illustrating a thermally activated seal configuration that provides electrical continuity in accordance with an advantageous embodiment.

With reference now to FIG. 27, a diagram illustrating a thermally activated seal configuration that provides electrical continuity is depicted in accordance with an advantageous embodiment. In this example, thermally activated seal 2700 may cover gap 2702 between inboard wing structure 2704 and outboard wing structure 2706.

In this example, thermally activated seal 2700 includes electrically conductive reinforcements similar to those in FIG. 26. These electrically conductive reinforcements may be found in layers 2708, 2710, 2712, and 2714 within thermally activated seal 2700. Additionally, these different layers may be connected to each other through reinforcements found in columns 2716, 2718, 2720, 2722, 2724, 2726, 2728, 2730, and 2732. These reinforcements may be connected through planer ligaments and various thickness attachment methods such as, for example, braising, soldering, welding, or other suitable methods to enable electrical conductivity in three-dimensions as illustrated in thermally activated seal 2700.

Matrix 2734 is a non-conductive matrix formed with a shaped memory polymer in these examples. In this example, columns 2716 and 2718 contact surface 2736 of inboard wing structure 2704, while columns 2730 and 2732 contact surface 2738 of outboard wing structure 2706. In this manner, electrical continuity may be provided between inboard wing structure 2704 and outboard wing structure 2706. Various electrical paths may be present through this matrix within thermally activated seal 2700.

For example, path 2740 and path 2742 are continuous electrical paths across gap 2702. These paths may provide an ability for electrical current to pass between inboard wing structure 2704 and outboard wing structure 2706. The sources of electrical current may include, for example, atmospheric current caused by lightning, current for electrical surface impedance, current supplied to devices within and/or attached to outboard wing structure 2706, and other suitable current/voltage sources.

Through the selection of layers and spacing between various conductive reinforcements in thermally activated seal 2700, various electrical and/or mechanical properties may be present concurrently.

Figure 28:
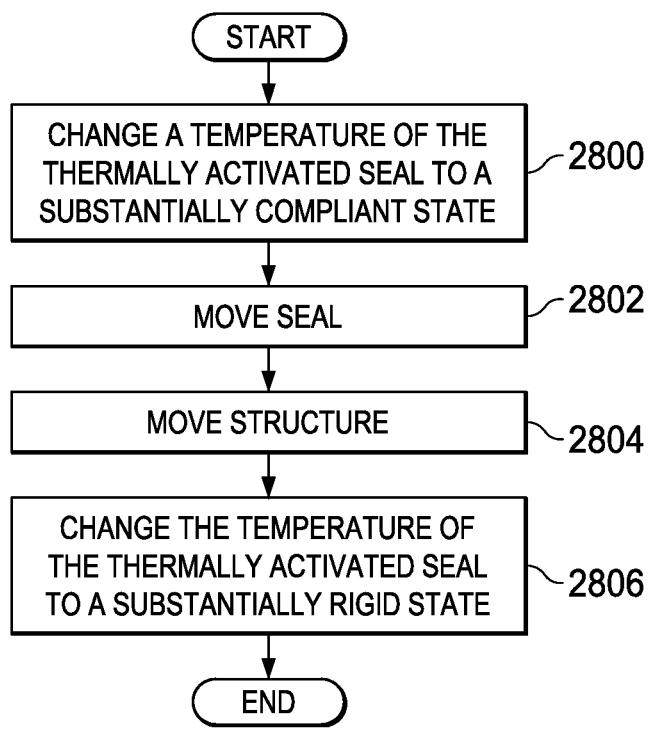
FIG. 28 is a flowchart of a process for manipulating a joint between two structures in accordance with an advantageous embodiment.

With reference now to FIG. 28, a flowchart of a process for manipulating a joint between two structures is depicted in accordance with an advantageous embodiment. The process illustrated in FIG. 28 may be implemented in an apparatus such as, for example, apparatus 300 in FIG. 3. As a specific example, this process may be implemented to move folding wings in aircraft 400 in FIG. 4 between a deployed position and a stowed position.

The process begins by changing a temperature of the thermally activated seal to place the seal in a substantially compliant state (operation 2800). This operation may be performed using an activation unit, such as activation unit 326 in FIG. 3. The activation unit may induce or send heat into the thermally activated seal to place it in the substantially compliant state. Following this heating operation, an actuation operation may be included to move the seal (operation 2802).

A second actuator manipulates the hinge and moves structure (operation 2804). This movement may be a movement of the outboard wing relative to the inboard wing, which are joined by a joint. This joint may be formed using a simple pivoting hinge or a complex hinge mechanism. This movement may be to move the outboard wing into either a deployed position or a stowed position.

The process then changes the temperature of the thermally activated seal to reach a substantially rigid state (operation 2806), with the process terminating thereafter. Operation 2806 may occur by allowing the thermally activated seal to cool as a result of exposure to ambient temperatures (forced or free convection). In other advantageous embodiments, the activation unit may actively cool the thermally activated seal using a device such as, for example, a refrigeration device (forced or free conduction).

This process may be used to either fold or unfold the wings of an aircraft. Further, this type of process may be applied to other types of structures with respect to moving those structures in different positions.

Thus, the different advantageous embodiments provide a method and apparatus for preventing or reducing gaping. A first structure may be positioned adjacent to a second structure such that the first structure is not in contact with the second structure. An activated seal is attached to at least one of the first structure and the second structure.

In other words, the activated seal may be attached to the first structure, the second structure, or to both structures. The activated seal has a variable stiffness that may be changed in response to stimuli, such that the activated seal is capable of being deformed when at least one of the first structure and the second structure are moved relative to each other.

The temperature of a thermally activated seal may be changed to change the stiffness of the thermally activated seal to a substantially compliant state from a substantially stiff state. The thermally activated seal is attached to at least one of a first structure and a second structure. At least one of the first structure and the second structure is moved while the thermally activated seal is in a substantially compliant state.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reducing gaps in an apparatus, the method comprising:
   changing a temperature of a thermally activated seal to change a stiffness of the thermally activated seal to a substantially compliant state from a substantially stiff state, wherein the thermally activated seal is attached to at least one of a first structure and a second structure in the apparatus; and
   moving at least one of the first structure and the second structure while the thermally activated seal is in the substantially compliant state such that a gap between the first structure and the second structure in the apparatus is reduced.

2. The method of claim 1 further comprising:
   changing the temperature of the thermally activated seal to change the stiffness of the thermally activated seal to the substantially stiff state.

3. The method of claim 1 further comprising:
   attaching a first part of the thermally activated seal to the first structure adjacent to the second structure wherein the thermally activated seal has variable stiffness properties at different temperatures; and
   attaching a second part of the thermally activated seal to the second structure.

4. The method of claim 1, wherein the thermally activated seal is substantially rigid at a first temperature and is substantially compliant at a second temperature.

5. The method of claim 1, wherein the changing step comprises:
   sending at least one of an electrical current and a microwave signal through the thermally activated seal to change the temperature.

6. The method of claim 1, wherein the first structure is an outboard wing structure and the second structure is an inboard wing structure.

* * * * *